US010684127B2

(12) United States Patent
Ziegenbein (10) Patent No.: US 10,684,127 B2
(45) Date of Patent: Jun. 16, 2020

(54) ZERO POSITIONING MEASURING DEVICE INCLUDING IMPROVED PROBE UNITS

(71) Applicant: Carl Mahr Holding GmbH, Goettingen (DE)

(72) Inventor: Rainer Ziegenbein, Rosdorf (DE)

(73) Assignee: Carl Mahr Holding GmbH, Goettingen (DE)

( * ) Notice: Subject to any disclaimer, the term of this patent is extended or adjusted under 35 U.S.C. 154(b) by 134 days.

(21) Appl. No.: 15/874,247

(22) Filed: Jan. 18, 2018

(65) Prior Publication Data

US 2018/0202803 A1    Jul. 19, 2018

(30) Foreign Application Priority Data

Jan. 19, 2017    (DE) .................. 10 2017 100 992

(51) Int. Cl.
*G01B 21/04*      (2006.01)
*G01B 5/008*      (2006.01)
*G01B 5/00*       (2006.01)

(52) U.S. Cl.
CPC ........... *G01B 21/042* (2013.01); *G01B 5/008* (2013.01); *G01B 21/04* (2013.01); *G01B 5/0002* (2013.01); *G01B 21/045* (2013.01)

(58) Field of Classification Search
CPC .... G01B 21/042; G01B 21/045; G01B 5/008; G01B 5/0002; G01B 11/02; G01B 9/02015; G01W 1/18; G01N 3/62; G01L 39/02015
See application file for complete search history.

(56) References Cited

U.S. PATENT DOCUMENTS

2009/0271996 A1    11/2009  Ferrari et al.

FOREIGN PATENT DOCUMENTS

| DE | 3640287 A1 | 6/1988 |
| DE | 4221989 A1 | 1/1994 |
| DE | 4421212 A1 | 12/1995 |
| DE | 19749754 A1 | 6/1999 |
| EP | 0740982 A2 | 11/1996 |
| EP | 1236972 A2 | 9/2002 |
| EP | 2017570 A1 | 1/2009 |
| WO | 2009/135447 A2 | 11/2009 |

OTHER PUBLICATIONS

European Search Report and Written Opinion dated Mar. 7, 2018, in corresponding European Application No. 18151445.6, with machine English translation (15 pages).

*Primary Examiner* — Harshad R Patel
*Assistant Examiner* — Nigel H Plumb
(74) *Attorney, Agent, or Firm* — Fitch, Even, Tabin, & Flannery LLP (57) ABSTRACT

A measuring device (10) has two measuring units (12), (13), each having a probe unit (16), (35). Each probe unit has a probe element (18), (37) having, in a probing direction (x), an outer probe side (18a) or (37a) and an inner probe side (18i) or (37i). To determine a zero position or a reference plane (B) at right angles to the probing direction (x), the two probe elements can be brought into contact via their respective outer probe sides (18a), (37a) or their respective inner probe sides (18i, (37i). As soon as contact between the associated probe sides (18a), (37a) or (18i), (37i) is detected, a reference plane (B) is defined as zero position in the probing direction (x) using the point of contact between the two probe elements. The zero position can thus be determined without calibrated standards or block gauges.

15 Claims, 5 Drawing Sheets

ZERO POSITIONING MEASURING DEVICE INCLUDING IMPROVED PROBE UNITS

CROSS-REFERENCE TO RELATED APPLICATIONS

This application claims all benefits provided by law including benefit of priority under 35 U.S.C. § 119 to German Patent Application No. 10 2017 100 992.2 filed Jan. 19, 2017, the content of which is hereby incorporated by reference in its entirety.

STATEMENT REGARDING FEDERALLY SPONSORED RESEARCH

Not Applicable

REFERENCE TO MICROFICHE APPENDIX

Not Applicable

TECHNICAL FIELD

The invention relates to a measuring device and a method for operating a measuring device. The measuring device has two probe units, each with a probe element that probes with contact. Probe elements of this kind are used in measuring devices for measuring a length measurand. When contacting a workpiece with the probe element, a measured length value can be determined at the workpiece on the basis of the position of the probe element relative to a defined starting or zero position.

BACKGROUND

In order to set a zero position of this kind in the measuring device, calibrated standards or gauge blocks of various design are used. These standards or block gauges, however, are also associated with uncertainties. The uncertainty of a cylindrical ring is specified by the Physikalisch-Technische Bundesanstalt (National Metrology Institute of the Federal Republic of Germany or "PTB" for short) as being 50 nanometres. Gauge blocks of which the uncertainty is specified as being 20 nanometres can also be used. The measurement accuracy is thus always limited to the accuracy of the reference object used to determine the starting position of the probe element of the measuring device. Further measurement inaccuracies are provided by the probe unit itself.

On this basis, the object of the invention can be considered to be that of creating a measuring device and a method which reduce the measurement uncertainty.

SUMMARY

The measuring device includes a first carrier part, on which a first probe unit is arranged, which has a first probe element. For probing a workpiece in the probing direction, the first probe element has an inner probe side and optionally also an outer probe side opposite the inner probe side. The outer probe side of the first probe element faces away from the first carrier part or the inner probe side of the first probe element faces towards the first carrier part. Depending on the design of the first probe unit, a workpiece can therefore be probed in the probing direction by only one of the probe sides or electively by the outer probe side or the opposite inner probe side of the probe element.

A second probe unit is arranged on a second carrier part, which second probe unit has a second probe element. The second probe unit is constructed correspondingly to the first probe unit. The second probe element, similarly to the first probe element, has an inner probe side in the probing direction and optionally an opposite outer probe side. The outer probe side of the second probe element faces away from the second carrier part or the inner probe side of the second probe element faces towards the second carrier part.

The first probe unit and/or the second probe unit are/is additionally designed to generate a first or second probe signal, which indicates whether the particular probe element is in contact with the workpiece or another object. To this end, the probe unit in question can detect for example the deflection of the probe element from a rest position and/or the force acting on the first probe element. One of the probe units can also be embodied passively, that is to say without the possibility of generating a probe signal, and therefore cannot perform any measurements without a sensor system, for example can have a probe body that cannot be deflected.

The measuring device has a first positioning arrangement designed to position a first carrier part relative to a machine base in a probing direction and/or a second positioning arrangement designed to position the second carrier part relative to a machine base in the probing direction. The first and/or the second positioning arrangement can additionally be designed to position the particular carrier part also in one or more other degrees of freedom in addition to the movement in translation in the probing direction. In this case, positionings in up to six degrees of freedom are possible.

The first or the second carrier part and the first or second probe system can be embodied so as to be fixed relative to the machine base.

The measuring device additionally has a control unit, to which the probe signals of the probe units are transmitted. The control unit is additionally designed to control the positioning arrangements and to perform the steps described hereinafter:

Before the actual measurement is taken, a reference plane is determined, which defines the starting or zero position so to speak of the probe elements. To this end, the first positioning unit and/or the second positioning unit are/is controlled in order to bring the inner probe side of the first probe element into contact with the inner probe side of the second probe element. As soon as the first probe signal and/or the second probe signal indicate that the two probe elements are in contact, the current position of contact of the two probe elements in relation to a coordinate system that is stationary relative to the machine base is defined as a point in the reference plane. The reference plane is oriented at right angles to the probing direction and is therefore defined explicitly by the point of contact of the two probe elements. The reference plane is stationary relative to the machine base. When the inner probe sides are brought into abutment against one another, the probe elements have to be moved past one another beforehand. This can be achieved by a corresponding relative movement of the carrier parts and/or an angled probe tip and/or an inclined position of the probe tips with the probe elements relative to one another or by probe elements arranged offset from one another transversely to the probing direction.

When determining the reference plane, a movement of the corresponding probe unit relative to the carrier part on which the probe unit is arranged is avoided in particular. Rather, it is in particular provided that the carrier parts are moved relative to one another in translation and/or in a rotary manner, jointly with the respective probe units arranged thereon. Starting from this reference plane, a measured length value can be determined at a workpiece at the time of the later measurement by determining the distance of the probe element from the reference plane or both distances of the probe elements from the reference plane.

The reference plane is determined without calibrated bodies or block gauges. By touching the two probe elements against one another, a reference plane is defined. The exact geometry of the probe elements does not need to be known.

A zero or starting position by determination of the reference plane is determined very easily and enables highly precise measurements in the probing direction.

Starting from this reference plane, the distances of the probe elements from the reference plane can be determined. When a workpiece is probed by the two probe elements for example on its opposite sides in the probing direction, the distance between these two sides, for example an outer diameter of a cylindrical workpiece, can be determined. It is alternatively or additionally also possible to determine the distance between inner sides of a workpiece facing towards one another by means of the two probe elements.

Each probe element can have an outer probe side opposite the inner probe side. The outer probe sides of the two probe elements can also be brought into contact in order to determine another reference plane.

It is advantageous if the control unit is designed to query whether, at the workpiece in the probing direction, an inner distance between two workpiece faces facing towards one another or an outer distance between two workpiece faces facing away from one another is to be measured. The query can be made for example in such a way that the information is obtained from a measuring programme of the measuring device. Depending on whether an inner distance or an outer distance is to be measured, it is advantageous in particular if the two inner probe sides of the probe elements are brought into contact when determining the reference plane in order to measure an inner distance. If an outer distance is to be measured, it is advantageous if the two outer probe sides of the probe elements are brought into contact in order to determine the reference plane.

The information as to whether an inner distance or an outer distance to be measured can also be transmitted to the control unit by an operator by means of a corresponding specification. The information can also be specified in a fixed manner in the control unit when merely inner distances or outer distances are measured by the measuring device.

It is advantageous if at least one of the probe units is mounted jointly with the corresponding carrier part so as to be movable in a rotary manner about the probing direction and/or in translation at right angles to the probing direction. The probe units can thus be moved together with the probe element and the carrier part in rotation and/or in translation by the corresponding positioning arrangement. By means of the movement in rotation and/or in translation in a plane parallel to the reference plane, the two probe units can be moved past one another in the probing direction and can be brought into contact via their inner probe sides.

It is also advantageous if each probe element is arranged at a free end of a probe tip of the corresponding probe unit or is formed by the free end of the probe tip. The probe tip extends preferably in a pin-like manner as far as its free end or as far as the probe element and is connected at its end opposite the probe element to a probe head of the corresponding probe unit. Depending on the measurement task, the probe tips or the probe elements can be exchangeable. For example, the probe element can be a ball tip or a spherical cap. The probe element can also have one or more probe tips. The probe element, in order to form the probe inner side and/or the probe outer side, is preferably shaped accordingly convexly in the probing direction on one or both opposite sides, for example by a single sphere or spherical cap or two spheres or two spherical caps.

In one exemplary embodiment a particular probe head can be designed to measure a force acting on the probe element and/or to measure a deflection of the probe element from a rest position. For example, the probe tip can be mounted on the probe head pivotably about a pivot axis oriented at right angles to the probing direction.

In order to measure or determine the current distance of a particular probe element from the reference plane, each carrier part can be assigned at least one interferometer arrangement. The interferometer arrangement has a laser interferometer arranged either on the carrier part or on the machine base and at least one reflector, which is arranged on the machine base when the laser interferometer is arranged on the carrier part and which is arranged on the carrier part when the laser interferometer is arranged on the machine base. The laser interferometer can be designed to emit at least one laser measuring beam towards an associated reflector in a corresponding emission direction oriented parallel to the probing direction and to receive the laser measuring beam reflected at the reflector. By forming a difference from a laser reference beam in a reference light path, a distance of the laser interferometer relative to the reflector and consequently of the carrier part or of the probe element relative to the reference plane can be determined. Any change to the distance of the laser interferometer from the relevant reflector can be detected in a highly precise manner. If the probe element in question is located in the reference plane, this can be defined in the interferometer arrangement or the control unit as the zero position. Movements of the laser interferometer relative to the at least one reflector from this zero position can be determined, which corresponds to a movement of the probe element relative to the reference plane in the probing direction. The position of the particular probe element is thus available in a highly precise manner. The laser interferometer transmits at least one distance signal to the control unit, which signal describes the distance of the laser interferometer from the at least one reflector in the probing direction.

It is possible that the laser interferometer emits two laser measuring beams towards respective reflectors in opposite emission directions parallel to the probing direction. A redundant determination of the distance can thus be provided, and the measurement accuracy can be further increased. In addition, it is possible to detect ambient influences by changes to the temperature, density, or composition of the air, etc. and to correct these when determining the measured value.

It is advantageous if each carrier part is assigned two interferometer arrangements. The laser interferometers of the two interferometer arrangements of a carrier part each have the same distance from a central plane in a transverse direction at right angles to the probing direction. The central plane is spanned by the probing direction and a vertical direction at right angles to the probing direction and at right angles to the transverse direction. The central plane is oriented at right angles to the reference plane. It is preferable if the workpiece is probed by means of the probe element and/or the two probe elements in the corresponding central plane in order to determine the reference plane. If the distance of the laser interferometers from the central plane is unequal, the difference must be known and can be taken into consideration accordingly at the time of correction.

The reference plane is preferably the plane arranged in the middle between the planes in which the reflectors are arranged, so that all reflectors have the same distance from the reference plane.

It is advantageous if the measuring device has a measuring frame. The measuring frame is arranged on the machine base and carries the provided reflectors. The measuring frame is free from forces caused by the workpiece, the positioning arrangements, or the probe units. External forces caused by the measuring device or the workpiece do not act on the measuring frame. For example, the measuring frame can have a baseplate, from which pillars protrude parallel to the reference plane and parallel to the central plane, wherein a reflector is arranged on each pillar. The pillars and the reflectors of an interferometer arrangement are arranged opposite one another in pairs in the probing direction. In one example four reflectors and consequently four pillars can be provided on the measuring frame.

Instead of the at least one interferometer arrangement, other known measuring arrangements or material measures can be used which enable the position of the probe element to be determined by mechanical and/or optical and/or magnetic and/or electromagnetic and/or other means.

Advantageous embodiments of the invention will emerge from the dependent claims, the description and the drawing. Preferred exemplary embodiments of the invention will be explained in detail hereinafter with reference to the accompanying drawing, in which:

DETAILED DESCRIPTION

Figure 1:
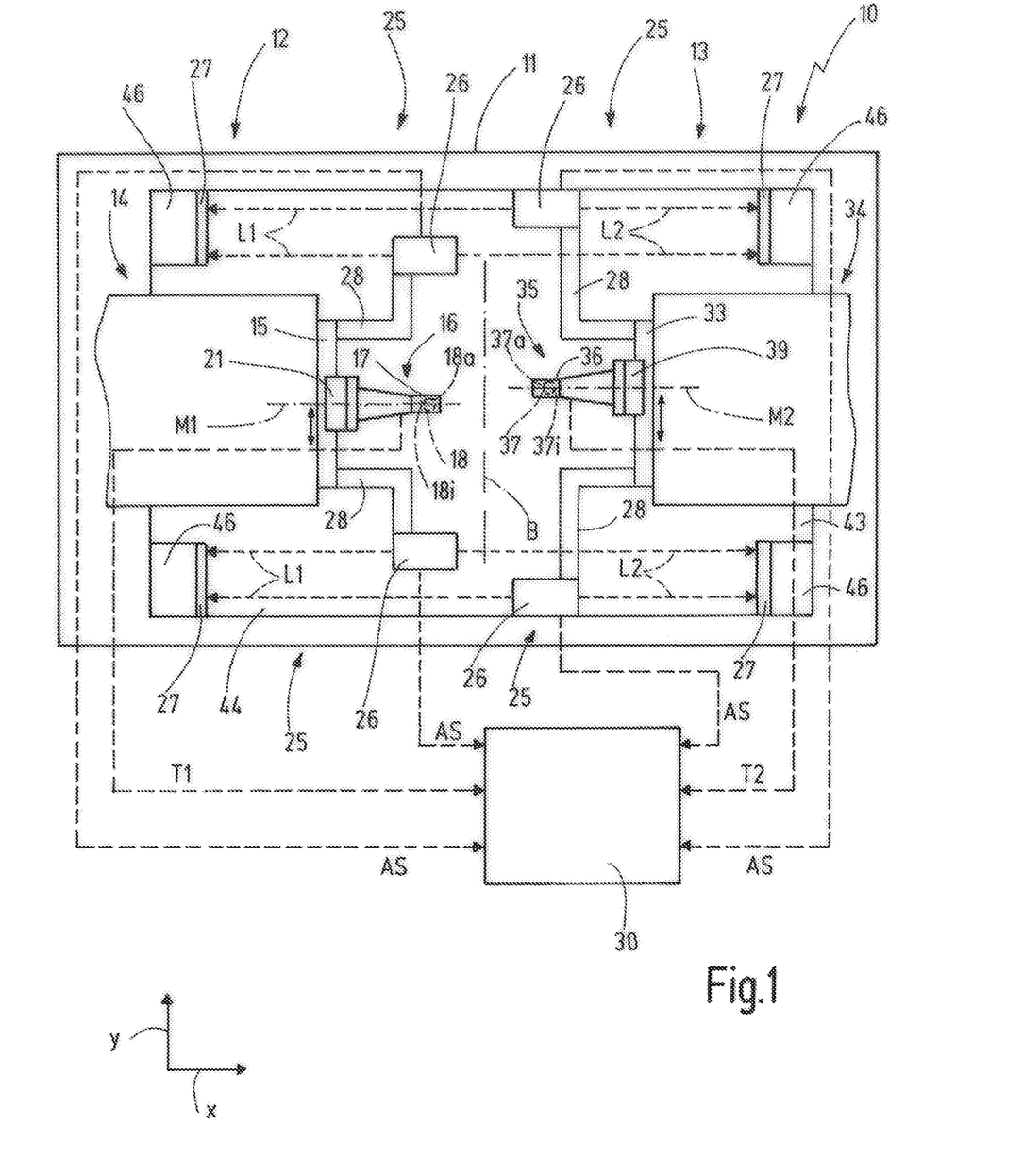
FIG. 1 shows a schematic block diagram-like illustration of an exemplary embodiment of a measuring device.
Figure 2:
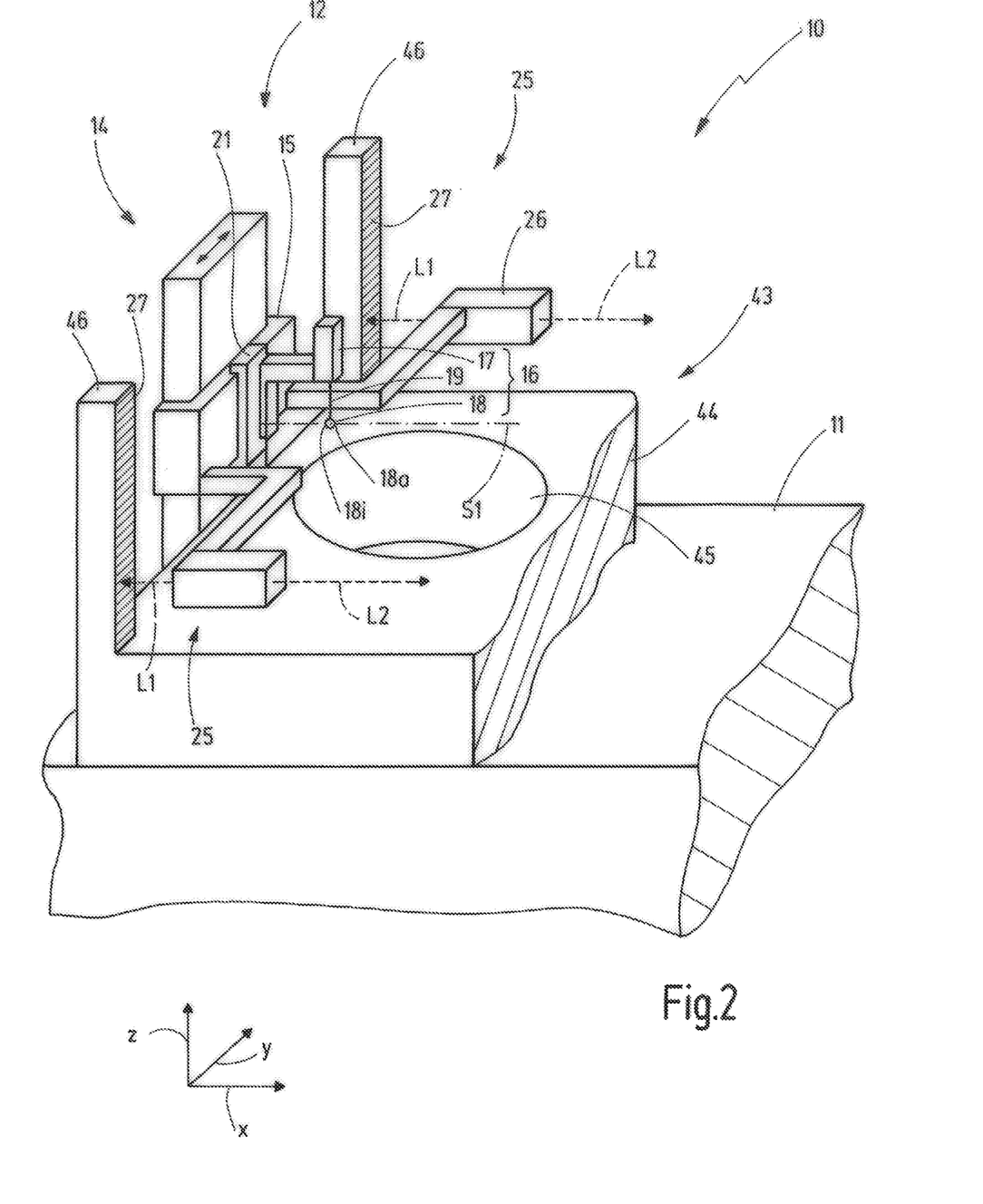
FIG. 2 shows the measuring device from FIG. 1 in a perspective partial illustration.

An exemplary embodiment of a measuring device 10 is illustrated in FIGS. 1 and 2. The measuring device 10 has a machine base 11, which is used to support the measuring device 10 on a substrate surface. The machine base 11 can be a machine frame or a cast body.

The measuring device 10 in the exemplary embodiment has two substantially identically constructed measuring units 12, 13, wherein merely the first measuring unit 12 is illustrated in FIG. 2.

The first measuring unit 12 includes a first positioning arrangement 14, which is designed to position a first carrier part 15 relative to the machine base 11 in a probing direction x. The first positioning arrangement 14 can also be designed to position the first carrier part 15 additionally in further degrees of freedom, wherein these can be degrees of freedom in translation and/or in rotation. For this purpose, the first positioning arrangement 14 can have corresponding drives and translational or rotary guides. The first carrier part 15 can be movable in up to six degrees of freedom.

A first probe unit 16 is arranged on the first carrier part 15 of the first measuring unit 12. The first probe unit 16 includes a first probe head 17 and a first probe element 18. The first probe element 18 is arranged on a free end of a first probe tip 19 or is formed by this free end. The opposite end of the first probe tip 19 is connected to the first probe head 17. The first probe head 17 is designed to measure a force acting on the first probe element 18 and/or a deflection of the first probe element 18 from a rest position. In this way, a workpiece 20 for example can be probed in order to measure a length measuring value.

The first probe unit 16 is arranged immovably relative to the first carrier part 15 in the probing direction x. The first positioning arrangement 14 can be designed to move the first probe unit 16 in translation at right angles to the probing direction x and/or in rotation about the probing direction x. In the exemplary embodiment described here, the first positioning arrangement 14 includes a first slide 21, which is arranged between the first carrier part 15 and the first probe unit 16 and is arranged on the carrier part 15 so as to be movable in a transverse direction y at right angles to the probing direction x. The first probe unit 16 can thus be moved in the transverse direction y by means of the first slide 21 for adjustment purposes (for example before a measurement). During the measurement, there is no displacement of the first slide 21. In addition, it is provided in the exemplary embodiment that the first probe unit 16 is arranged on the first slide 21, or in a modified embodiment on the carrier part 15, so as to be pivotable about a first pivot axis S1. The first pivot axis S1 extends parallel to the probing direction x. The first pivot axis S1 runs preferably centrally through the first probe element 18.

The first measuring unit 12 additionally includes at least one interferometer arrangement 25. In the exemplary embodiment shown here the first measuring unit 12 has two interferometer arrangements 25, each having a laser interferometer 26 and at least one reflector 27, and in accordance with the example two reflectors 27. The laser interferometer 26 is embodied in each case as a double interferometer and has an interferometer unit for each laser measuring beam. The two reflectors 27 of an interferometer arrangement 25 are arranged opposite one another in pairs in the probing direction x. Each laser interferometer 26 emits at least one laser measuring beam L1, L2, and in the exemplary embodiment described here two laser measuring beams L1, L2, which are emitted by the laser interferometer 26 towards respective associated reflectors 27 in opposite directions parallel to the probing direction x, are reflected there, and are received again in the corresponding laser interferometer 26. As is usual in the case of an interferometer, the light reflected and received at the relevant reflector 27 is superimposed with a reference laser beam, thus causing constructive and/or destructive interference. The interference image is detected by receiver, in particular a camera. Changes to the distance of the laser interferometer 26 from a corresponding reflector 27 can therefore be very accurately detected because the interference image changes as a result. It is thus possible to determine the position of the laser interferometer 26 in the probing direction x very accurately. A redundancy is achieved by the determination of the position of each laser interferometer 26 relative to two reflectors 27. Measurement inaccuracies can thus be further reduced, and external influences, for example which can be caused by changes to the temperature, the air composition, the density of the air, etc., can be taken into consideration.

Each laser interferometer 26 is connected, in particular immovably, to the first carrier part 15 in accordance with the example by means of a holder 28. At the least, movement of the laser interferometer 26 in the probing direction x relative to the carrier part 15 is not possible. The position of the laser interferometer 26 relative to the first probe element 18 in the probing direction x is thus also fixed.

As shown in FIG. 1, the first measuring unit 12 has two interferometer arrangements 25. The two laser interferometers 26 of the two interferometer arrangements 25 have the same distance in the transverse direction y from a first central plane M1 of the first measuring unit 12. The first central plane M1 is oriented at right angles to the transverse direction y and is therefore spanned by the probing direction x and a vertical direction z. The vertical direction z is oriented at right angles to the probing direction x and to the transverse direction y. The first pivot axis S1 extends in the first central plane M1. The first central plane M1 runs through the first probe element 18. A workpiece 20 is proved in the first central plane M1 when measuring a length measuring value.

The first probe unit 16 is designed to generate a first probe signal T1, which indicates whether the probe element 18 is in contact with an object, for example a workpiece 20. By means of the force acting on the probe element 18 and/or the deflection of the probe element 18, touching or contact with the object can be identified. The first probe signal T1 is transmitted to a control unit 30.

The second measuring unit 13 is constructed similarly to the first measuring unit 12. Reference is therefore made fundamentally to the description above. The second measuring unit 13 has a second carrier part 33, which is movable by means of a second positioning arrangement 34 in the probing direction x and possibly in further degrees of freedom in translation and/or in rotation. A second probe unit 35 having a second probe head 36 and a second probe element 37 is arranged on the second carrier part x. Similarly to the first measuring unit 12, a second slide 39 is provided between the second carrier part 33 and the probe head 36, which second slide is displaceable in the transverse direction y solely for adjustment purposes (when no measurement is being performed). The second probe element 37 is arranged at the free end of a second probe tip 38 or is formed by this free end. In addition, it is provided in the exemplary embodiment that the second probe unit 35 is arranged on the second slide 39, or in a modified embodiment on the second carrier part 39, so as to be pivotable about a second pivot axis S2. The second pivot axis S2 extends parallel to the probing direction x. The second pivot axis S2 runs preferably centrally through the second probe element 37.

The two slides 21, 29 can also be omitted, in a deviation from FIGS. 1 and 2. In FIGS. 3 to 8 the carrier part 15 or 33 is illustrated merely schematically without the slide 21, 39.

The second measuring unit 13, similarly to the first measuring unit 12, also has at least one interferometer arrangement, in accordance with the example two interferometer arrangements 25, each having a laser interferometer 26. The laser interferometers 26 of the two interferometer arrangements 25 of the second measuring unit 13 are arranged in the transverse direction y at the same distance from a second central plane M2, which is oriented at right angles to the transverse direction y.

The second probe unit 35 is designed to generate a second probe signal T2 when contact between the second probe element 37 and an object, for example a workpiece 20, is determined. The second probe signal T2 is also transmitted to the control unit 30.

In addition, the control unit 30 receives at least one distance signal AS from each interferometer arrangement 25. In the exemplary embodiment described here, each laser interferometer 26 emits two laser measuring beams L1, L2 in opposite emission directions to respective reflectors 27 and can thus measure two independent distance values from the two reflectors 27. Accordingly, the relevant distance signal AS of each interferometer arrangement 25 can contain two independent distance values in accordance with the example and can be transmitted to the control unit. A redundancy is thus provided, by means of which ambient influences can also be identified, taken into consideration, and used in the calculation of corrected distance values of the relevant probe element 18, 37 in relation to a zero position or reference plane.

FIGS. 1 and 2 schematically illustrate that the reflector 27 in accordance with the example are not arranged directly on the machine base 11, but on a measuring frame 43. The measuring frame 43 is free from forces caused by the positioning arrangements 14, 34 and the workpiece 20. The measuring frame does not have to support any forces from the measuring device 10 or the workpiece. The measuring frame 43 is arranged on the machine base 11. In the exemplary embodiment it has a baseplate 44 with a recess 45. In the recess 45, the workpiece or a workpiece mount or workpiece clamping device of the measuring device 10 can protrude partially or completely through the baseplate 44, without being supported on the baseplate 44 of the measuring frame 43.

Pillars 46 of the measuring frame 43 protrude in the vertical direction x. In the exemplary embodiment they have a cuboid shape. The pillars 46 are arranged in pairs at a distance from one another in the probing direction x. A reflector 27 is arranged on the facing sides of second pillars 46 arranged oppositely in the probing direction x. The laser interferometers 26 of the interferometer arrangements 25 are disposed in each case between two reflectors 27 arranged oppositely in the probing direction x (FIG. 1). The measuring frame 43 can be produced from a material that has a low temperature coefficient. It can also be different from the material of the machine base 11.

In order to be able to determine a measured length value at a workpiece 20, a starting position or zero position must firstly be defined as reference relative to the machine base 11. In the exemplary embodiment described here, a reference plane B (FIG. 1) is defined for this purpose, which reference plane is oriented at right angles to the probing direction x and is immovable relative to the measuring frame 43 or the machine base 11. The procedure for determining the reference plane B will be explained with reference to FIGS. 3-8.

The first probe element 18, as considered in the probing direction x, has an outer probe side 18a facing away from the first carrier part 15 and an inner probe side 18i facing towards the first carrier part 15. Accordingly, the second probe element 37 has an outer probe side 37a facing away from the second carrier part 33 and an inner probe side 37i facing towards the second carrier part 33. The probe sides of the two carrier parts can be seen in particular in FIGS. 3-8. On account of the pivotability of the two probe units 16, 35 about the respective pivot axes S1, S2 and/or the displaceability of the carrier parts 15, 33 in the transverse direction y, the two probe units 16, 25 can be moved past one another by moving one or both carrier parts 15, 33 in the probing direction x. It is thus possible for the two probe elements 18, 37 to be brought into contact via their respective inner probe sides 18*i*, 37*i*. A situation of this kind is illustrated by way of example in FIG. 3 and FIG. 7.

Figure 5:
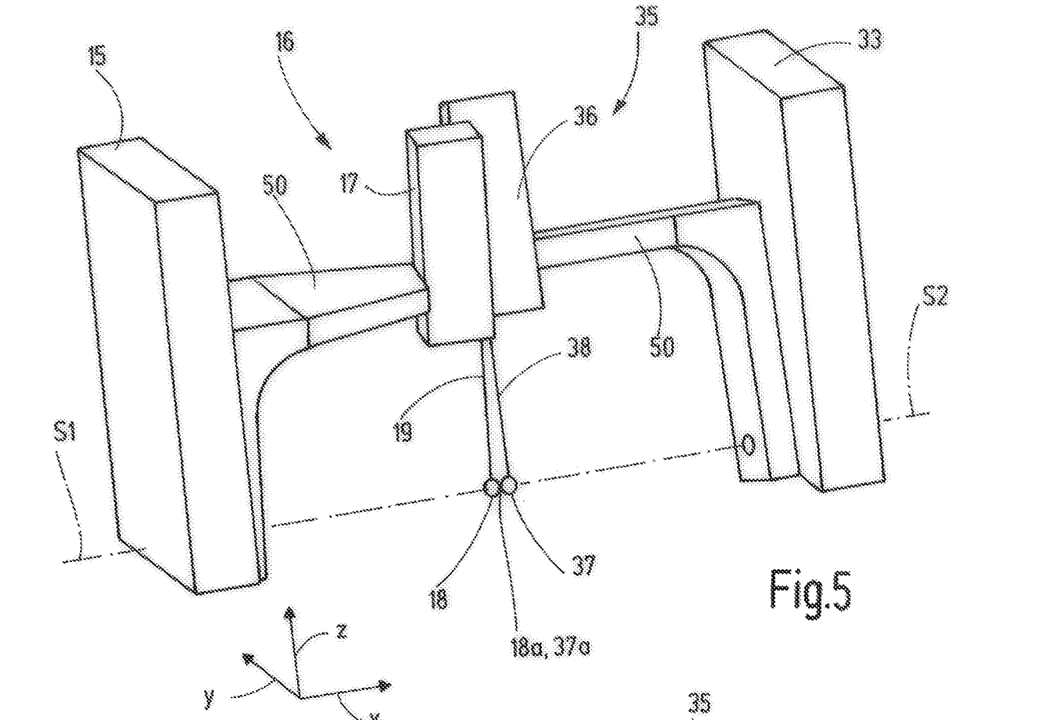
FIG. 5 shows a schematic perspective basic diagram of the contacting of two probe elements in order to determine a reference plane.

It is also possible to position the two probe units 16, 35 in such a way that the respective outer probe sides 18*a*, 37*a* of the two probe elements 18 and 37 contact one another (FIG. 5).

By bringing the two probe elements 18, 37 into contact with one another either via their respective outer probe sides 18*a*, 37*a* or via their respective inner probe sides 18*i*, 37*i*, the reference plane B at the point of contact can be determined or defined. A single point in space is sufficient for this purpose, since the orientation of the reference plane B is provided at right angles to the probing direction x. The control unit 30 stores the position of the probe elements 18, 37 or of the probe sides 18*i*, 37*i* or 18*a*, 37*a* contacting one another as zero position in the probing direction x. A movement of the probe element 18 or 37 in the probing direction x starting from the reference plane B (i.e. starting from the zero position) can then be measured by means of the at least one interferometer arrangement 25 of each measuring unit 12 and 13. If a workpiece 20 is then touched by the two probe units 16, 35, a measured length value for the workpiece 30 can be determined on this basis, since the position of the two probe elements 18, 37 relative to the reference plane B when the workpiece 20 is touched is known.

In order to determine the reference plane B, when the two probe elements 18, 37 touch or when the probe sides 18*i* and 37*i* or 18*a* and 37*a* come into contact, the probe units 16, 35 are not moved relative to their respective carrier parts 15, 33, so as not to compromise the accuracy. A movement of the probe units 16, 35 relative to their respective carrier parts 15, 33 can be performed prior to the measurement in order to align the probe elements 18, 37 when setting up the measuring device or for other adjustment purposes.

Figure 4:
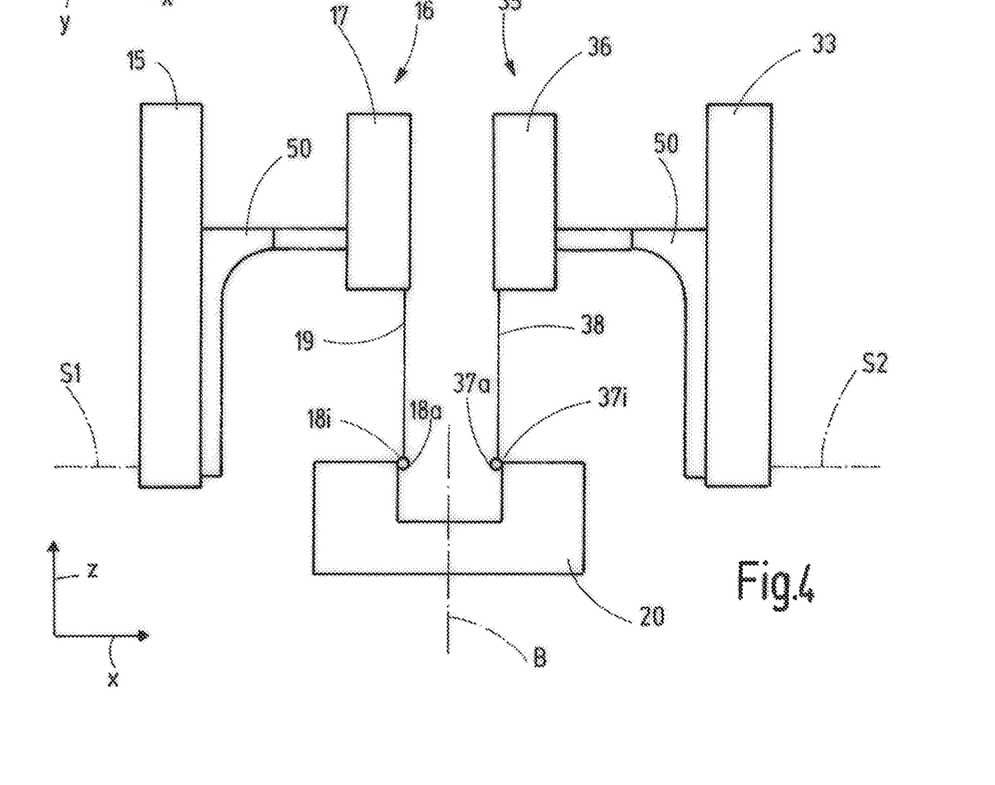
FIG. 4 shows a schematic basic diagram when measuring an inner distance.
Figure 6:
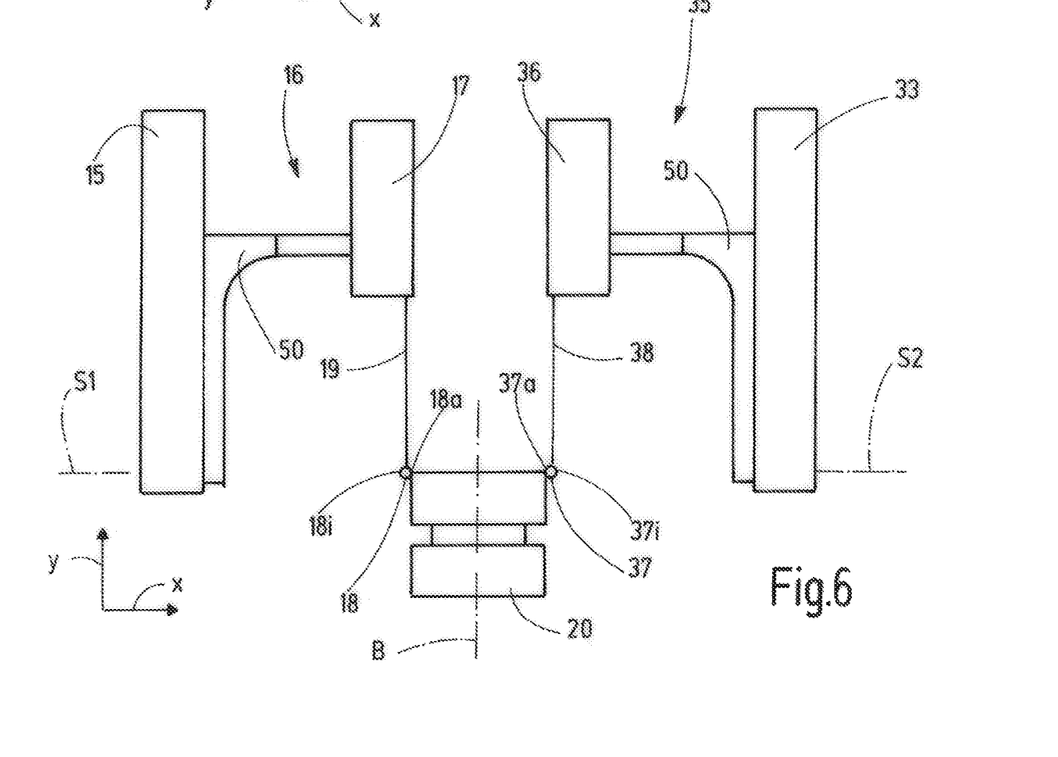
FIG. 6 shows a schematic basic diagram when measuring an outer distance.
Figure 8:
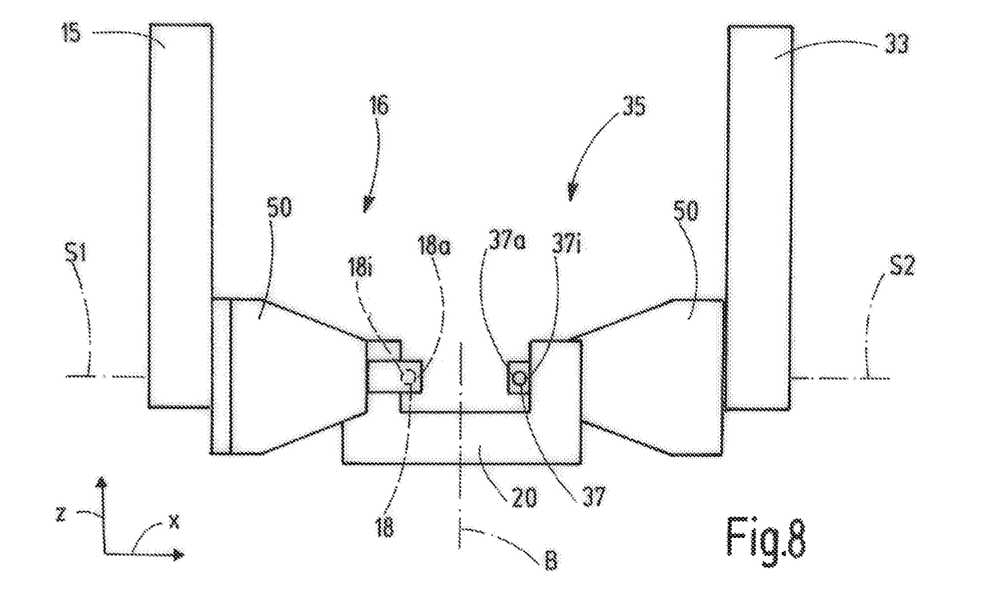
FIG. 8 shows a schematic basic diagram when measuring an inner distance.

In particular, the control unit 30 or the measuring device 10 is designed to define the reference plane B by bringing the two inner probe sides 18*i*, 37*i* of the probe elements 18, 37 into contact when an inner distance between two workpiece faces facing one another is to be measured at the workpiece 20, as is illustrated by way of example in FIGS. 4 and 8. If an outer distance between two workpiece faces facing away from one another is to be determined at the workpiece 20, the reference plane B is defined preferably by bringing the two outer probe sides 18*a*, 37*a* of the probe elements 18, 37 into contact (FIGS. 5 and 6). The workpiece 20 is thus probed in the same orientation in the probing direction x in which the reference plane B is determined. The measurement inaccuracy that can be caused by the probe units 16, 35 when the orientation of the probing in the probing direction x changes is thus reduced.

The touching of the two outer probe sides 18*a*, 37*a* or of the two inner probe sides 18*i*, 37*i* can be identified in the control unit 30 by the first probe signal T1 and/or the second probe signal T2. The two probe units 16, 35 are brought here into a pivoted position about the corresponding pivot axes S1, S2 which matches, to the greatest possible extent, the orientation as the workpiece 20 is being measured. For example, the probe tips 19, 38 can be oriented approximately in the vertical direction z or at a small, acute angle relative to the vertical direction z (FIG. 3) if, as the workpiece 20 is measured, the probe tips 38, 39 are likewise oriented substantially in the vertical direction z. Conversely, as the reference plane B is determined (FIG. 7), the probe tips 19, 38 can also be oriented approximately in the transverse direction y if this position is also used during the subsequent measuring of the workpiece 20 (FIG. 8).

Figure 3:
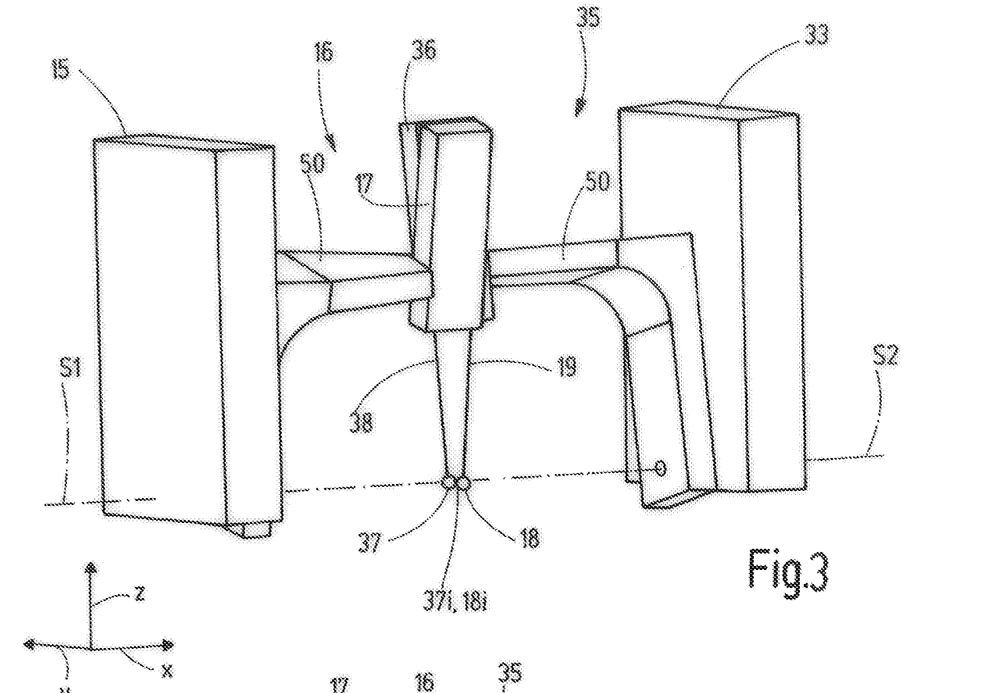
FIG. 3 shows a schematic perspective basic diagram of the contacting of two probe elements with one another in order to determine a reference plane.
Figure 7:
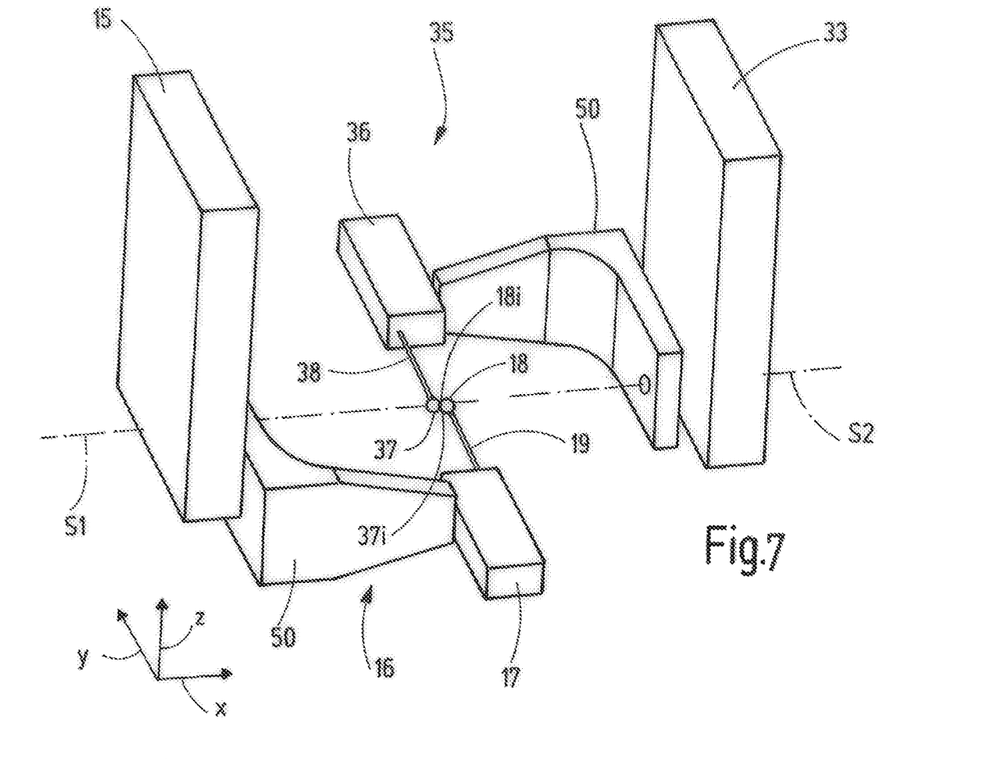
FIG. 7 shows a schematic perspective basic diagram of the contacting of two probe elements in order to determine a reference plane.

By means of the pivotability of at least one of the two probe units 16, 35 and/or the movability of at least one of the two carrier parts 15, 33 in the transverse direction y, the probe elements 18, 37 can be moved past one another in the probing direction x and can be brought into abutment via their respective inner probe sides 18*i*, 37*i* (FIGS. 3 and 7). For this purpose, the probe heads 17, 36 are connected to the respective associated slides 21, 39 by means of a holding part 50 so as to be pivotable about the respective pivot axes S1, S2. So as to be able to perform a probing operation using the corresponding inner probe side 18*i*, 37*i*, a sufficiently large distance must be provided in any case between the relevant inner probe side 18*i*, 37*i* and the associated slide 21, 39 or carrier part 15, 33. This can be achieved in accordance with the example by the holding part 50, which has a portion extending in the probing direction x.

The invention relates to a measuring device 10 and a method for operation thereof. The measuring device 10 has two measuring units 12, 13, each having a probe unit 16, 35. Each probe unit has a probe element 18, 37. Each probe element 18, 37 has, in a probing direction x, an outer probe side 18*a* or 37*a* and an inner probe side 18*i* or 37*i* opposite the outer probe side. In order to determine a zero position or a reference plane B at right angles to the probing direction x, the two probe elements can be brought into contact via their respective outer probe sides 18*a*, 37*a* or their respective inner probe sides 18*i*, 37*i*. As soon as one of the two probe units 16 or 35 detects contact between the associated probe sides 18*a*, 37*a* or 18*i*, 37*i*, a reference plane B is defined as zero position in the probing direction x by means of the point of contact between the two probe elements. The zero position can thus be determined easily and precisely without calibrated standards or block gauges.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

LIST OF REFERENCE SIGNS 10 measuring device
11 machine base
12 first measuring unit
13 second measuring unit
14 first positioning arrangement
15 first carrier part
16 first probe unit
17 first probe head
18 first probe element
18*a* outer probe side of the first probe element
18*i* inner probe side of the first probe element
19 first probe tip
20 workpiece
21 first slide
25 interferometer arrangement
26 laser interferometer
27 reflector
28 holder
30 control unit 33 second carrier part
34 second positioning arrangement
35 second probe unit
36 second probe head
37 second probe element
37a outer probe side of the second probe element
37i inner probe side of the second probe element
38 second probe tip
39 second slide
43 measuring frame
44 baseplate
45 recess
50 holding part
AS distance signal
M1 first central plane
M2 second central plane
S1 first pivot axis
S2 second pivot axis
T1 first probe signal
T2 second probe signal
x probing direction
y transverse direction
z vertical direction

What is claimed is:

1. A measuring device (10) comprising:
a first probe unit (16), which is arranged on a first carrier part (15) and which has a first probe element (18) having an inner probe side (18i) facing the first carrier part (15) and an outer probe side (18a) opposite the inner probe side (18i) in a probing direction (x);
a second probe unit (35), which is arranged on a second carrier part (33) and which has a second probe element (37) having inner probe side (37i) facing the second carrier part (33) and an outer probe side (37a) opposite the inner probe side (37i) in the probing direction (x);
a first positioning arrangement (14), which is configured to position the first carrier part (15) in a probing direction (x), and/or with a second positioning arrangement (34), which is configured to position the second carrier part (33) in the probing direction (x);
wherein the first probe unit (16) is configured to generate a first probe signal (T1), which indicates whether the first probe element (18) is in contact with an object, and/or wherein the second probe unit (35) is configured to generate a second probe signal (T2), which indicates whether the second probe element (37) is in contact with an object;
a control unit (30), to which the first and/or second probe signal (T1, T2) are/is transmitted, wherein the control unit (30) is configured to control the first and/or second positioning arrangement (14, 34) and to perform the following steps:
controlling the first and/or second positioning arrangement (14, 34) in order to bring the inner probe side (18i) of the first probe element (18) into contact with the inner probe side (37i) of the second probe element (37) if an inner distance is to be measured, or in order to bring the outer probe side (18a) of the first probe element (18) into contact with the outer probe side (37a) of the second probe element (37), if an outer distance is to be measured; and
determining a reference plane (B), oriented at right angles to the probing direction (x), using one single point of contact in space at the point of contact of the first and second probe elements (18, 37) when the first probe signal (T1) and/or the second probe signal (T2) indicates that the first and second probe elements (18, 37) are in contact.

2. The measuring device according to claim 1, wherein the second carrier part (33) is arranged immovably compared to a machine base (11).

3. The measuring device according to claim 1, wherein the control unit (30) is configured to request whether, at a workpiece (20), an inner distance between two workpiece faces, facing one another, is to be measured in the probing direction (x) or an outer distance between two workpiece faces facing away from one another is to be measured in the probing direction (x).

4. The measuring device according to claim 3, wherein the control unit (30) requests information as to whether an inner distance or an outer distance is to be measured at the workpiece (20) in the probing direction (x) from a measuring program activated to take a measurement.

5. The measuring device according to claim 1, wherein at least one of the probe units (16, 35) is mounted jointly with the corresponding carrier part (15, 33) so as to be movable in rotation about the probing direction (x) and/or in translation at right angles to the probing direction (x).

6. The measuring device according to claim 1, wherein each probe element (18, 37) is arranged at a free end of a probe tip (19, 38) of the corresponding probe unit (16, 35) or is formed by the free end of the probe tip (19, 38).

7. The measuring device according to claim 6, wherein the probe tip (19, 38) extends in a pin-like manner as far as the probe element (18, 37) and is connected via its end opposite the probe element (18, 37) to a probe head (17, 36) of the probe unit (16, 35).

8. The measuring device according to claim 7, wherein the probe head (17, 36) is configured to measure a force acting on the probe element (18, 37) and/or to measure a deflection of the probe element (18, 37) from a rest position.

9. The measuring device according to claim 1, comprising at least one interferometer arrangement (25), having a laser interferometer (26) which is arranged on the carrier part (15, 33) or on a machine base (11) and which is configured to emit at least one laser measuring beam (L1, L2) in the probing direction (x) towards an assigned reflector (27) and to receive the laser measuring beam (L1, L2) reflected at the reflector (27), wherein the reflector (27) is arranged on the machine base (11) when the laser interferometer (26) is arranged on the carrier part (15, 33), and wherein the reflector (27) is arranged on the carrier part (15, 33) when the laser interferometer (26) is arranged on the machine base (11).

10. The measuring device according to claim 9, wherein the laser interferometer (26) transmits at least one distance signal (AS) to the control unit (30), which signal describes the distance of the laser interferometer (26) from the at least one reflector (27) in the probing direction (x).

11. The measuring device according to claim 10, wherein the provided reflectors (27) are arranged on a measuring frame (43) arranged on the machine base (11).

12. The measuring device according to claim 1, wherein each carrier part (15, 33) is assigned two interferometer arrangements (25), wherein laser interferometers (26) of the two interferometer arrangements (25), in a transverse direction (y) at right angles to the probing direction (x), are each arranged at the same distance from a central plane (M1, M2) oriented at right angles to the transverse direction (y).

13. A method for operating a measuring device (10) with a first probe unit (16), which is arranged on a first carrier part (15) and which has a first probe element (18) having an inner probe side (18*i*) facing the first carrier part (15) and an outer probe side (18*a*) opposite the inner probe side (18*i*) in the probing direction (x), with a second probe unit (35), which is arranged on a second carrier part (33) and which has a second probe element (37) having an inner probe side (37*i*) facing the second carrier part (33) and an outer probe side (37*a*) opposite the inner probe side (37*i*) in the probing direction (x), and with a first positioning arrangement (14) for positioning the first carrier part (15) in the probing direction (x) and/or a second positioning arrangement (34) for positioning the second carrier part (33) in the probing direction (x), said method comprising:

controlling the first positioning unit (14) and/or the second positioning unit (34) in order to bring the inner probe side (18*i*) of the first probe element (18) into contact with the inner probe side (37*i*) of the second probe element (37), if an inner distance is to be measured or in order to bring the outer probe side (18*a*) of the first probe element (18) into contact with the outer probe side (37*a*) of the second probe element (37), if an outer distance is to be measured; and determining a reference plane (B), oriented at right angles to the probing direction (x), by using one single point of contact in space at the point of contact of the probe elements (18, 37) when contact between the probe elements (18, 37) has been identified.

14. The method according to claim 13, wherein once the reference plane (B) has been determined, a length measuring value is measured at a workpiece (20) and is determined on the basis of the distances of the probe elements (18, 37) from the reference plane (B) when the workpiece (20) is touched.

15. The method according to claim 13, using the probe elements (18, 37) in a same orientation with reference to the probing direction (x) for probing a workpiece (20) and for determining the reference plane (B).

* * * * *